(12) United States Patent
Kobayashi et al.

(10) Patent No.: US 7,846,610 B2
(45) Date of Patent: Dec. 7, 2010

(54) ELECTROLYTE MEMBRANE, PRODUCTION METHOD THEREOF, AND FUEL CELL

(75) Inventors: Motokazu Kobayashi, Yokohama (JP); Makoto Kubota, Tokyo (JP); Keiko Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 12/441,590

(22) PCT Filed: Oct. 18, 2007

(86) PCT No.: PCT/JP2007/070771

§ 371 (c)(1),
(2), (4) Date: Mar. 17, 2009

(87) PCT Pub. No.: WO2008/050820

PCT Pub. Date: May 2, 2008

(65) Prior Publication Data

US 2009/0269646 A1   Oct. 29, 2009

(30) Foreign Application Priority Data

Oct. 23, 2006   (JP) .............................. 2006-288061

(51) Int. Cl.
*H01M 8/10* (2006.01)

(52) U.S. Cl. .................. 429/493; 429/491; 429/492

(58) Field of Classification Search ................ 429/479, 429/491, 492, 493, 306, 310, 311, 314, 317; 29/623.5
See application file for complete search history.

(56) References Cited

U.S. PATENT DOCUMENTS

| | | | |
|---|---|---|---|
| 6,248,469 B1 | 6/2001 | Formato et al. | |
| 6,339,038 B1 | 1/2002 | Tada et al. | |
| 2005/0031925 A1 | 2/2005 | Ofer et al. | |
| 2006/0088750 A1 | 4/2006 | Nobuta et al. | |

FOREIGN PATENT DOCUMENTS

| | | |
|---|---|---|
| EP | 1 905 791 A1 | 4/2008 |
| EP | 1 947 717 A1 | 7/2008 |
| JP | 2-111440 A | 4/1990 |
| JP | 2000-003712 A | 1/2000 |
| JP | 2000-277131 A | 10/2000 |
| JP | 2001-514431 A | 9/2001 |
| JP | 2002-289222 A | 10/2002 |
| JP | 2004-146279 A | 5/2004 |
| JP | 2005-068396 A | 3/2005 |
| JP | 2005-133092 A | 5/2005 |
| JP | 2006-073495 A | 3/2006 |
| JP | 2006-117828 A | 5/2006 |
| JP | 2007-022959 A | 2/2007 |
| WO | 99/10165 A9 | 8/1999 |
| WO | 2007/010731 A1 | 1/2007 |
| WO | 2007/052605 A1 | 5/2007 |

*Primary Examiner*—Jennifer K Michener
*Assistant Examiner*—Carlos Barcena
(74) *Attorney, Agent, or Firm*—Fitzpatrick, Cella, Harper & Scinto (57) ABSTRACT

An electrolyte membrane with high durability is provided. The electrolyte membrane includes a porous film containing a nitrogen-containing heterocyclic ring or a cyano group, and a proton conductive component existing in pores of the porous film, wherein the proton conductive component includes a polymer compound containing at least a nitrogen-containing heterocyclic ring, a cyano group, and an acidic group in one molecule.

9 Claims, 3 Drawing Sheets

FIG. 1

○ 3: NITROGEN-CONTANING HETEROCYCLIC RING OF POROUS FILM

□ 4: NITROGEN-CONTANING HETEROCYCLIC RING OF HIGH MOLECULAR COMPOUND

⇧ 5: CYANO GROUP OF HIGH MOLECULAR COMPOUND

△ 6: ACIDIC GROUP OF HIGH MOLECULAR COMPOUND

ELECTROLYTE MEMBRANE, PRODUCTION METHOD THEREOF, AND FUEL CELL

TECHNICAL FIELD

The present invention relates to an electrolyte membrane, a production method thereof, and a fuel cell using the electrolyte membrane.

BACKGROUND ART

As an electrolyte membrane for a polymer electrolyte fuel cell (PEFC) (or proton exchange membrane fuel cell (PEMFC)), a perfluorosulfonic acid membrane typified by Nafion (trade name) membrane of E. I. du Pont de Nemours and Company is generally used. However, this membrane has disadvantages such that the proton conductivity is still low; the power generation efficiency is low because a fuel is liable to permeate when a liquid fuel such as alcohol or the like is used; and the change in dimension thereof at the time of swelling is large.

Therefore, an electrolyte membrane in which a proton conductive component is infiltrated in pores of an insulating porous film has been studied. The electrolyte membrane having such a structure can suppress alcoholic permeability and reduce dimensional changes due to containing water while maintaining the electrical conductivity by using an insulating porous film for a base material.

Japanese Patent Application Laid-Open No. 2004-146279 discloses an electrolyte membrane obtained by infiltrating the inside of a porous base material with a monomer and polymerizing the monomer, and refers to 2-methylpropane-2-acrylamide sulfonic acid as the monomer and to polyimide and polyolefine as the porous base material.

However, according to the technology disclosed in Japanese Patent Application Laid-Open No. 2004-146279, since the adhesion of the porous base material and the infiltrating component is insufficient, it is considered that the polymer drops out from the inside of the pores during use for a long period of time, resulting in lowering of the output (the durability is insufficient).

Further, Japanese Patent Application Laid-Open No. 2000-277131 discloses an electrolyte membrane composed of an ion exchanger obtained by copolymerizing a lipophilic monomer, a heterocyclic monomer, a carboxylic acid-based monomer, and a strong acid group-based monomer, and an electrolyte membrane formed of a porous film. A morpholine ring is mentioned as the heterocyclic monomer, and polyimide is mentioned as the porous film.

However, according to the technology disclosed in Japanese Patent Application Laid-Open No. 2000-277131, even if the polyimide porous film and the ion exchanger containing the morpholine ring are adhered to each other by the interaction of a functional group, it is considered that the adhesion therebetween is insufficient, and therefore the durability is insufficient.

According to the present invention, an electrolyte membrane with high adhesion between a porous film and a proton conductive component can be obtained. Further, by using the electrolyte membrane, a fuel cell with high durability can be provided.

DISCLOSURE OF THE INVENTION

The present invention provides an electrolyte membrane including a porous film containing a nitrogen-containing heterocyclic ring or a cyano group; and a proton conductive component existing in pores of the porous film, wherein the proton conductive component includes a polymer compound containing at least a nitrogen-containing heterocyclic ring, a cyano group, and an acidic group in one molecule.

The polymer compound preferably includes at least a nitrogen-containing heterocyclic ring, a cyano group, and an acidic group at a side chain.

The nitrogen-containing heterocyclic ring of the polymer compound is preferably at least one of a morpholine ring and a phthalimide ring.

The proton conductive polymer is preferably a compound having a structure represented by General Formula (1).

(1)

wherein L is 1; m is 2 or more and 25 or less; n is 0.05 or more and 7 or less; the polymerization degree p is 1 or more and 30,000 or less; $R_1$, $R_2$, and $R_3$ are each independently selected from a hydrogen atom and a methyl group; $R_4$ is a single bond, an acyl group having 1 to 8 carbon atoms, or an alkylene group, a phenylene group, or a phenylene alkyl group each containing an acyl group or an ester bond; and $R_5$ and $R_6$ are each independently a single bond, an alkylene group having 1 to 8 carbon atoms, a phenylene group, or an alkyl phenylene group, and may contain at least one of an acyl group, an ester bond, and a hetero atom.

The porous membrane is preferably composed of polyimide or polyacrylonitrile.

The porous membrane is preferably composed of polyimide or polyacrylonitrile.

Further, according to another aspect of the present invention, there is provided a fuel cell using the electrolyte membrane.

According to still another aspect, the present invention provides a method of producing an electrolyte membrane, which includes:

infiltrating a porous film containing a nitrogen-containing heterocyclic ring or a cyano group with a mixed liquid including at least a compound having a nitrogen-containing heterocyclic ring, a compound having a cyano group, and a compound having an acidic group; and polymerizing the compounds in the mixed liquid infiltrated in the porous film.

Further features of the present invention will become apparent from the following description of exemplary embodiments with reference to the attached drawings.

BEST MODE FOR CARRYING OUT THE INVENTION

Hereinafter, embodiments for carrying out the present invention will be described in detail.

The electrolyte membrane of the present invention includes a porous film containing a nitrogen-containing heterocyclic ring or a cyano group; and a proton conductive component existing in pores of the porous film, wherein the proton conductive component includes a polymer compound containing at least a nitrogen-containing heterocyclic ring, a cyano group, and an acidic group in one molecule.

By producing an electrolyte membrane so as to have such a structure, high proton conductivity and high durability can be realized.

Figure 1:
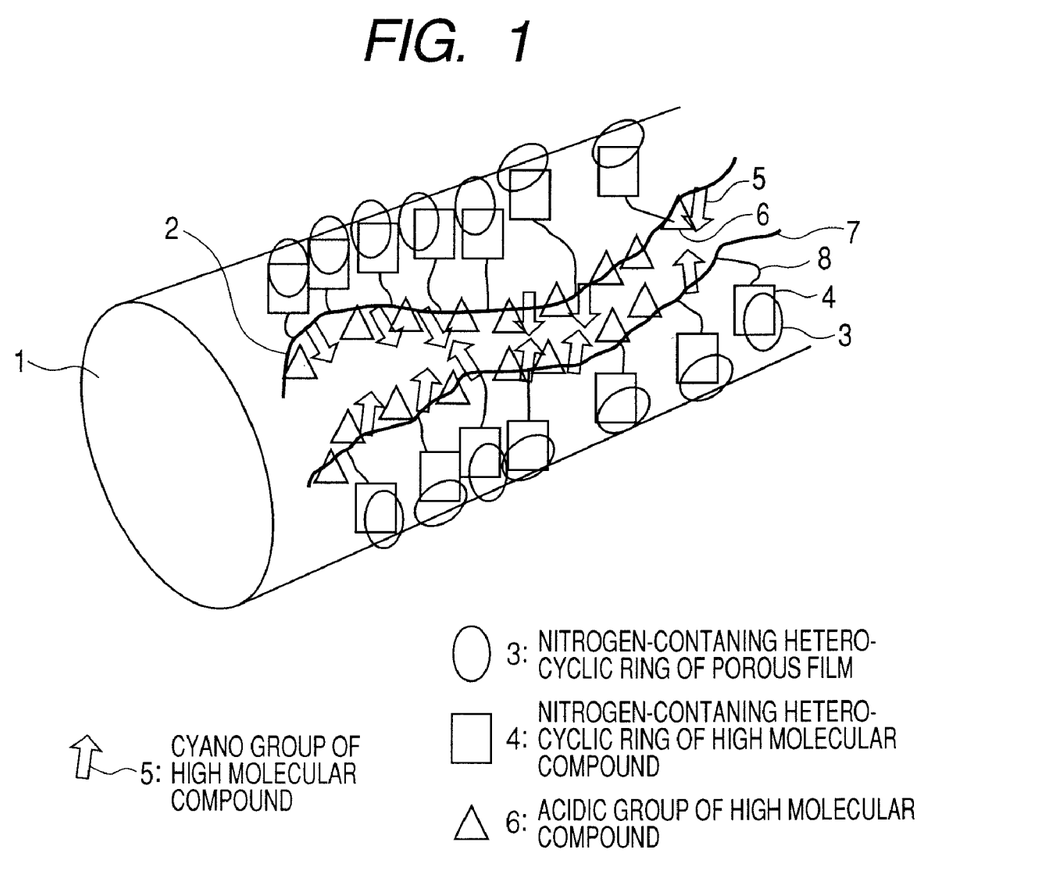
FIG. 1 is a view schematically illustrating the arrangement of functional groups of a polymer compound infiltrated in pores of a porous film of an electrolyte membrane according to an example of the present invention.

As shown in FIG. 1, the electrolyte membrane is composed of a porous film 1 and a proton conductive component composed of a polymer compound 2, and the proton conductive component is held inside the porous film 1. Here, the expression "the proton conductive component is held inside the porous film 1" does not always refer to a case where the entirety of the proton conductive component is held inside a space formed by the porous film 1, and includes a case where a most part of the proton conductive component is held inside the space.

The porous film 1 contains a compound having a nitrogen-containing heterocyclic ring 3 or a compound having a cyano group, and the polymer compound 2 contains a nitrogen-containing heterocyclic ring 4, a cyano group 5, and an acidic group 6 in one molecule.

When the porous film 1 contains a compound having a nitrogen-containing heterocyclic ring 3, a number of nitrogen-containing heterocyclic rings 3 are present on the surface of the porous film 1. In contrast, since the polymer compound 2 constituting the proton conductive component also contains nitrogen-containing heterocyclic ring 4, a large number of nitrogen-containing heterocyclic rings 4 are present on the surface of the proton conductive component.

Therefore, as shown in FIG. 1, it is considered that the nitrogen-containing heterocyclic rings 4 contained in the polymer compound 2 are stacked on each other, and the nitrogen-containing heterocyclic ring 4 contained in the polymer compound 2 and the nitrogen-containing heterocyclic ring 3 contained in the porous film 1 are stacked, whereby the adhesion between the proton conductive component and the porous film 1 is improved.

Figure 2:
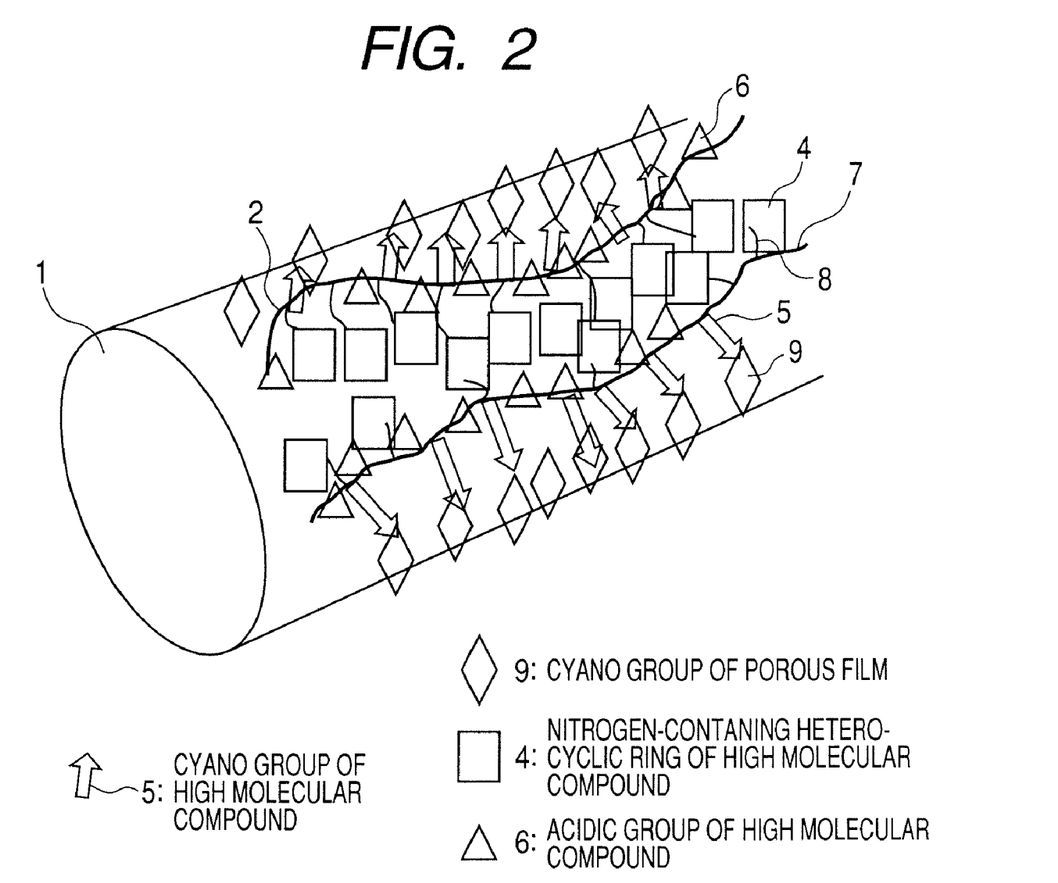
FIG. 2 is a view schematically illustrating the arrangement of functional groups of a polymer compound infiltrated in pores of a porous film of an electrolyte membrane according to another example of the present invention.

In contrast, when the porous film 1 contains a compound having a cyano group, a number of cyano groups 9 are present on the surface of the porous film. In contrast, since the polymer compound 2 constituting the proton conductive component also has cyano groups 5, a large number of cyano groups 5 are present on the surface of the proton conductive component.

The cyano groups are attracted to each other by a dipolar interaction. Therefore, as shown in FIG. 2, with respect to the polymer compound 2 contained in the proton conductive component, which is present in the porous film 1, the polymer compounds 2 are stacked on each other and the polymer compound 2 is stacked on the porous film 1 by the dipolar interaction of the cyano group. This is considered to increase the adhesion between the polymer compound 2 and the porous film 1.

Therefore, it is presumed that even when the porous film 1 has either one of the nitrogen-containing heterocyclic ring 3 and the cyano group 9, the polymer compound 2 can be prevented from easily dropping out of the pores of the porous film 1, thereby improving the durability.

Moreover, the polymer compound 2 is regularly immobilized within the porous film 1, thereby also immobilizing the acidic groups 6 in a regular order. Thus, a proton conductive domain is formed, thereby improving proton conductivity.

Hereinafter, each component constituting the electrolyte membrane is described.

The porous film 1 is selected from those substances which hold a proton conductive component therein and exhibit sufficient strength, flexibility, and durability when used as an electrolyte membrane for a fuel cell.

Examples of the nitrogen-containing heterocyclic ring 3 contained in the porous film 1 include a phthalimide ring, an imide ring, a pyrrole ring, an imidazole ring, an oxazole ring, a thiazole ring, a morpholine ring. Therefore, for the porous film 1 containing the nitrogen-containing heterocyclic ring 3, various resin materials such as a polyimide resin material, a polyamide resin material, and a polyimide-amide resin material can be used. Among the above material, it is preferable to contain polyimide as a main ingredient.

When the porous film 1 contains the cyano group 9, a polyacrylonitrile resin and the like can be used for the porous film 1. It is to be noted that the porous film 1 may be a complex containing two or more kinds of resins. Therefore, it is a matter of course that resin, in which a polymer containing the nitrogen-containing heterocyclic ring 3 and a polymer containing the cyano group 5 are copolymerized, may be used. The term "polyimide resin" herein employed refers to a resin containing polyimide or a polyimide derivative, and the same applies to other kinds of resins.

The thickness of the porous film 1, the dimension and opening ratio of the pores of the porous film 1 are not particularly limited and are selected according to the material, the strength of an intended electrolyte membrane, the characteristics of an intended fuel cell, etc. Generally, the thickness of an electrolyte membrane for use in a fuel cell is preferably 10 µm or more and 150 µm or less, and thus, it is preferable that the thickness of the porous film 1 be within the above-mentioned range. This is because there is a possibility that when the film thickness of the porous film 1 is less than 10 µm, the strength at the time of assembling as a fuel cell or during use is small, resulting in fracture, and while when the film thickness of the porous film 1 is more than 150 µm, the internal resistance may increase, resulting in lowering of the power generation efficiency. The term "porosity of a porous film" herein employed refers to a state in which a number of pores are present in a polymer film. Preferably, the pores are not separated but are moderately connected to form a passage through which gas and liquid can permeate from one side of the membrane to the other side of the membrane. It is to be noted that when gas and liquid can smoothly pass, there is a possibility that crossover of a fuel may occur, resulting in lowering of the performance. Therefore, it is preferable for the pores to be connected in such a nonlinear manner that a substantial permeation distance becomes long. The degree of the permeation can be controlled by the film thickness, the dimension of the pores, and the like.

The average diameter of the pores of the porous film is preferably 0.1 µm or more and 10 µm or less, and more preferably 0.1 µm or more and 5 µm or less. When the average diameter of the pores observed on the surface of the porous film is smaller than 0.1 µm, there is a possibility that the infiltrating efficiency of the compound may be lowered, thereby resulting in a reduction of the power generation efficiency. In contrast, when the average diameter of the pores is larger than 10 μm, there is a possibility that the crossover amount of a fuel may increase, whereby a reverse reaction may occur at a cathode side.

The proton conductive component has a function of transferring protons generated at a fuel electrode to an air electrode.

Examples of the nitrogen-containing heterocyclic ring 4 contained in the polymer compound 2 which constitutes the proton conductive component include a morpholine ring, a phthalimide ring, a pyrazolidine ring, a captolactam ring. Among the above rings, when the porous film 1 is polyimide, a morpholine ring or a phthalimide ring is preferable as the nitrogen-containing heterocyclic ring 4.

Moreover, as the acidic group 6 contained in the polymer compound 2 which constitutes the proton conductive component, a strong acid group is preferable. Sulfonic acid, phosphoric acid, and the like are mentioned as such an acidic group.

It is to be noted that, since the cyano group 5 contained in the polymer compound 2 which constitutes the proton conductive component has an effect of increasing the electron-withdrawing property and the dielectric constant, the proton conductive component containing a cyano group draws an electron from an acidic group, promotes the dissociation of a hydrogen atom, and also improves the proton conductivity.

Further, although it is necessary that the polymer compound 2 have the nitrogen-containing heterocyclic ring 4, the cyano group 5, and the acidic group 6 in one molecule, it is preferable for the polymer compound 2 to have a main chain 7 and a side chain 8, and to have the nitrogen-containing heterocyclic ring 4, the cyano group 5, and the acidic group 6 at the side chain 8, as shown in FIG. 1. By having these groups at the side chain, the acidic groups 6 are arranged better in a regular orientation. It is to be noted that the number of atoms, which exist over the range from the main chain to functional groups such as a heterocyclic ring, a cyano group, an acidic group, and the like is preferably from 0 to 8. This is because when the number of atoms exceeds 8, the flexibility of the side chain becomes high and the stacked state of functional groups is in disorder, which sometimes results in that a favorable domain structure of the acidic group cannot be formed. Moreover, based on the fact that each functional group exists in the vicinity, it is presumed that the domain formation of the acidic group becomes clearer and the proton conductivity can be improved by the electron-withdrawing effect of the cyano group.

As an example of the polymer compound containing the nitrogen-containing heterocyclic ring 4, the cyano group 5, and the acidic group 6 at the side chain 8, there is a compound having a structure represented by the following general formula (1).

wherein L is 1; m is 2 or more and 25 or less; n is 0.05 or more and 7 or less; the polymerization degree p is 1 or more and 30,000 or less; $R_1$, $R_2$, and $R_3$ are each independently selected from a hydrogen atom and a methyl group; $R_4$ is a single bond, an acyl group having 1 to 8 carbon atoms, or an alkylene group, a phenylene group, or a phenylene alkyl group each containing an acyl group or an ester bond; and $R_5$ and $R_6$ are each independently a single bond, an alkylene group having 1 to 8 carbon atoms, a phenylene group, or an alkyl phenylene group, and may contain at least one of an acyl group, an ester bond, and a hetero atom.

Next, a production method of the electrolyte membrane of the present invention will be described.

The method of producing an electrolyte membrane of the present invention includes:

(i) mixing a compound having a nitrogen-containing heterocyclic ring, a compound having a cyano group, and a compound having an acidic group to prepare a mixed liquid;

(ii) infiltrating a porous film with the mixed liquid of (i); and (iii) polymerizing the compounds in the mixed liquid infiltrated in the porous film of (ii).

As to Step of (i)

The mixing ratio of the compound having a nitrogen-containing heterocyclic ring, the compound having a cyano group, and the compound having an acidic group are preferably adjusted in such a manner that, when the compounds are polymerized to form a polymer compound, the compound having an acidic group is 2 mol or more and 25 mol or less ($2 \leq m \leq 25$), and the compound having a cyano group is 0.05 mol or more and 7 mol or less ($0.05 \leq n \leq 7$), per 1 mole (L=1) of the compound having a nitrogen-containing heterocyclic ring. More preferably, the compound having an acidic group is 2 mol or more and 20 mol or less ($2 \leq m \leq 20$), and the compound having a cyano group is 0.05 mol or more and 5 mol or less ($0.05 \leq n \leq 5$), per 1 mole (L=1) of the compound having a nitrogen-containing heterocyclic ring. The reason for this is that when the compound having an acidic group is less than 2 mol per 1 mole of the compound having a nitrogen-containing heterocyclic ring, sufficient proton conductivity is not exhibited and the function as an electrolyte membrane is sometimes not acquired. The compound having an acidic group may be added in an amount exceeding 20 mol, but there is a possibility that the proton conductivity cannot be improved in proportion to the addition amount. Further, since the proportions of other compounds relatively decrease, the functions such as orientating property may be lowered. When the compound having a cyano group and a polymerization site is less than 0.05 mol per mole of the compound having a nitrogen-containing heterocyclic ring, the ability of attracting a hydrogen atom from an acidic group is insufficient, and the effect of increasing the proton conductivity may not be sufficiently exhibited. Moreover, there is a possibility that the dipolar interaction exerted between molecules may become weak as a whole. In contrast, when the proportion of the compound having a cyano group and a polymerization site exceeds 7 mol, the amount of an acidic group may relatively decrease, and the proton electrical conductivity may be lowered.

The polymerization degree p may be 1 or more and 30,000 or less, and preferably 5 or more and 30,000 or less. This is because when the polymerization degree p is less than 5, the resultant may be easily dissolved in water and sufficient strength may not be acquired.

It is to be noted that the ratio of the mixed compounds and the ratio of the respective compounds in the polymerized polymer compound do not substantially vary, and therefore, in order that the ratio of the respective compounds falls within the above-mentioned range, the mixing ratio of the respective compounds may be within the above-mentioned range. However, when the ratio sharply vary, the mixing ratio of the respective compounds may be suitably changed.

Moreover, the respective compounds may be a common compound. For example, when a compound having a nitrogen-containing heterocyclic ring, a cyano group, and a polymerization site is present, the compound having a nitrogen-containing heterocyclic ring and a polymerization site and the compound containing a cyano group and a polymerization site are the same.

Further, the above-mentioned compounds form a polymer through polymerization and, specifically, a monomer, an oligomer, and the like are mentioned.

Acryloyl morpholine, vinylphthalimide, and the like are mentioned as the compound containing a nitrogen-containing heterocyclic ring and a polymerization site. A plurality of the substances may be combined to form a compound containing a nitrogen-containing heterocyclic ring.

Specific examples of the compound having a cyano group and a polymerizable site include acrylonitrile, methacrylonitrile, vinylbenzyl cyanide, cyanopropenyl acetate, cyano ethyl acrylate, $\alpha$-cyano cyanocinnamic acid, and the like. A plurality of the substances may be combined to form a compound containing a cyano group.

As a compound containing an acidic group and a polymerization site, vinylsulfonic acid, allylsulfonic acid, methallyl sulfonic acid, acrylamide methylpropanesulfonic acid, or methacrylate ethyl phosphate can be selected as a source material. These substances may be used in combination of two or more. It is to be noted that a compound having an acidic group and a polymerization site may be a compound in which an acidic group is quaternary ammoniated at a stage where the compound is infiltrated in a porous film. When using the compound containing the quaternary-ammoniated acidic group, the quaternary-ammoniated acidic acid is returned to an acidic group by heating or substitution using an aqueous sulfuric acid solution, or the like, after polymerization in the step of (iii). An acidic group is quaternary ammoniated by, for example, a method of reacting a tertiary-amine compound with the compound containing an acidic group.

It is preferable not to add a solvent to a mixed liquid. If a solvent is used, probably the solvent may remain inside the pores of the porous film to be infiltrated with the mixed liquid in the step of (ii), and portions where the solvent has evaporated may form holes. The formation of holes is not preferable because an acidic group domain is blocked and the proton conductivity may be lowered. Especially, when a solvent having a high-boiling point is used, it will take much energy and time to evaporate the solvent and a burden on the environment is increased. The term "solvent" herein employed refers to a substance which dissolves and dilutes the compound having a nitrogen-containing heterocyclic ring, the compound having a cyano group, the compound having an acidic group, and other additives. Specifically, organic solvents such as acetone, toluene, alcohol, tetrahydrofuran, dimethylsulfoxide, dimethylformamide, acetonitrile; inorganic solvents such as sulfuric acid, hydrochloric acid, nitric acid; and the like are mentioned. Each compound may contain a slight amount of water or the like, which is originally contained in each compound. However, when the compounds are mixed, it is preferable that the content of water or the like is 10% by weight or less, preferably 5% by weight or less.

In order to obtain a mixed liquid, at least one of the compound having a nitrogen-containing heterocyclic ring and a polymerization site, the compound having a cyano group and a polymerization site, and the compound having an acidic group and a polymerization site needs to be used in a solution state. When at least one compound is in a solution state, other compounds are mixed with the solution to enable formation of a uniformly mixed solution.

To the mixed solution, additives other than the compound having a nitrogen-containing heterocyclic ring and a polymerization site, the compound having a cyano group and a polymerization site, and the compound having an acidic group and a polymerization site may be added. Specifically, a cross linking agent for three-dimensionizing (three-dimensionally cross-linking) a straight-chain polymer, another monomer which participates in a polymerizing reaction, a surfactant, an antifoaming agent, a polymerization initiator, and the like are mentioned.

As to Step of (ii)

A method of infiltrating a porous film with a mixed liquid will be described.

When a porous film is brought into contact with a mixed liquid, pores are infiltrated with the mixed liquid. There is no limitation on the contacting process. For example, a porous film may be simply immersed in the mixed liquid. In order to increase the infiltrating efficiency, ultrasonic vibration may be applied or a roller, a blade, or a process of filtration under reduced pressure or pressure filtration may be employed together, if needed. The porous film may be infiltrated with the mixed liquid after the inside of the porous film has been subjected to hydrophilization treatment by corona discharge, or the like.

As to Step of (iii)

A method of polymerizing a compound contained in the mixed liquid which has been infiltrated in the porous film will be described. An energy is applied while the porous film is infiltrated with the mixed liquid, the compound is polymerized in the porous film, and the state of the resultant is changed from a solution state to a solid state or a gel state, thereby obtaining an electrolyte membrane. As the energy for polymerization, light or heat can be used. Therefore, polymerization can be performed by irradiating active light or heating from the outside under the condition where the porous film is infiltrated with the mixed liquid. Among the above, it is preferable to perform polymerization by irradiating electron beams as the active light.

When a polymer compound is obtained by polymerization, stacking and orientation occur between the porous film and the polymerized polymer compound and between the polymer compounds as shown in FIGS. 1 and 2, and a domain optimal for the improvement of the proton conductivity is formed, thereby improving the adhesion with the porous film and preventing the polymer compound from dropping off.

The irradiation amount of an electron beam is not limited, and is preferably 100 Gy or more and 10 MGy or less, and particularly, preferably 5 kGy or more and 200 kGy or less. When the irradiation amount is less than 100 Gy, chemical bonds may not be sufficiently formed. In contrast, when the dose is more than 10 MGy, there is a possibility that the porous film and functional groups in the polymer compound may be denatured.

The acceleration voltage of an electron beam varies depending on the thickness of an electrolyte membrane, and is preferably about 20 to 250 kV in, for example, a membrane with a thickness of about 10 to 150 μm. A plurality of electron beams with different acceleration voltages may be irradiated.

The acceleration voltage may be varied during the irradiation of electron beams. Heat treatment may be performed during the irradiation of an electron beam or immediately after the irradiation thereof, if needed.

An electrolyte membrane can be obtained as described above.

When unnecessary polymer remains on the surface of the obtained electrolyte membrane, the polymer may be removed by washing.

Next, a fuel cell unit using the electrolyte membrane of the present invention will be described.

Figure 3:
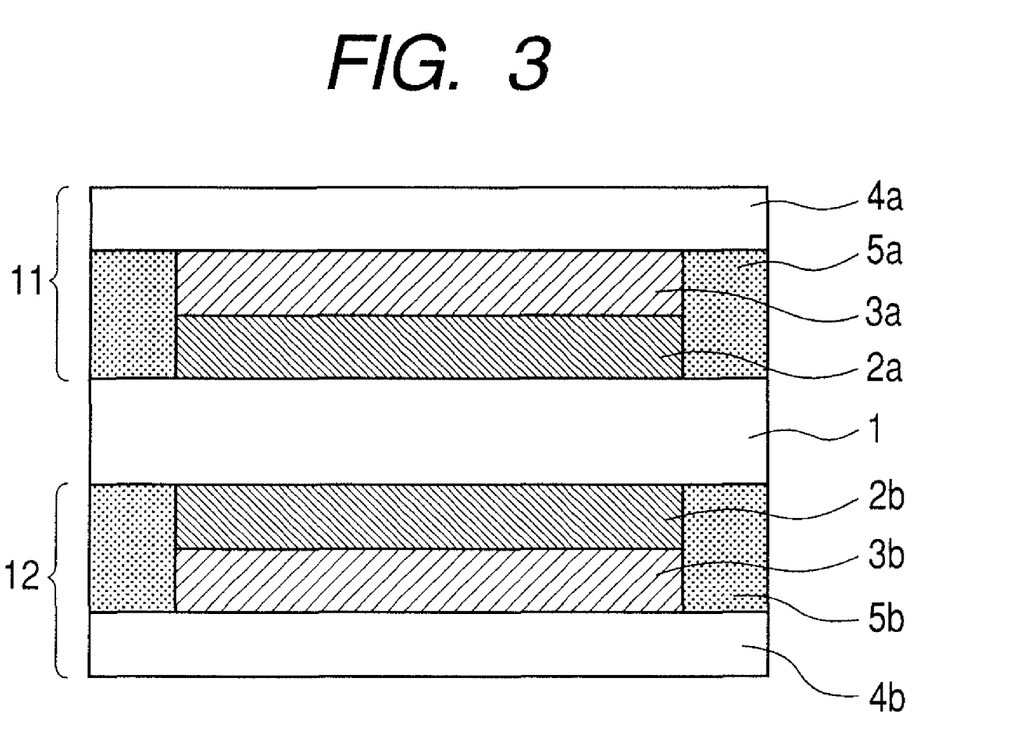
FIG. 3 is a schematic diagram illustrating an embodiment of a fuel cell of the present invention.

FIG. 3 is a view schematically illustrating a fuel cell according to an embodiment of the present invention. The fuel cell of this embodiment is produced by stacking an electrolyte membrane, electrode catalyst layers, diffusion layers, electrodes, and gasket as shown in FIG. 3. The shape of the fuel cell is not limited. Also, there is no limitation on the production processes, and conventional production processes can be used.

The fuel cell shown in FIG. 3 has a structure in which catalyst layers 2a and 2b are provided on both sides (two sides opposite to each other) of the above-mentioned electrolyte membrane 1; diffusion layers 3a and 3b and gaskets 5a and 5b are provided outside thereof; and electrodes 4a and 4b which serve as a current collector are provided outside of the side on which diffusion layers 3a and 3b and the gaskets 5a and 5b are provided.

The catalyst layers 2a and 2b each function as a catalyst for reaction of generating protons and electrons from a fuel and function as a catalyst for reaction of generating water from oxygen, electrons, and protons. The catalyst layers 2a and 2b are formed of a substance in which a catalyst structure is carried on electrical conductive carbon or a catalyst structure, and the catalyst structure constituting the catalyst layer may be in the form of particles, dendritic structure, etc. The average particle diameter of the catalyst structure is preferably 0.5 nm or more and 20 nm or less, and particularly preferably 1 nm or more and 10 nm or less. When the average particle diameter is less than 0.5 nm, the activity of catalyst particles alone is extremely high, presumably resulting in difficulty in handling. In contrast, when the average particle diameter exceeds 20 nm, the surface area of the catalyst decreases and reaction sites decrease, which may lower the activity. It is to be noted that, for convenience, the expression "particle diameter" of a catalyst structure, is used here. However, when the catalyst structure is in the form other than particles, the "particle diameter" refers to a half of the maximum distance between two points in the catalyst structure.

As a catalyst material which constitutes the catalyst structure, platinum group metals such as platinum, rhodium, ruthenium, iridium, palladium, and osmium can be used and alloys of platinum and these metals may be used. Especially, when using methanol as a fuel, it is preferable to use an alloy of platinum and ruthenium.

Electrically conductive carbon can be selected from carbon black, carbon fiber, graphite, carbon nanotube, and the like. The average particle diameter of the conductive carbon is preferably within the range of 5 nm or more and 1,000 nm or less, more preferably within the range of 10 nm or more and 100 nm or less. However, since agglomeration occurs to some extent in practical use, it is considered that the particle diameter distribution is within the range of 20 nm or more and 1,300 nm or less.

Further, in order to carry the above-mentioned catalyst, it is preferable that the specific surface area is large to some extent, and the specific surface area is preferably 50 $m^2/g$ or more and 3,000 $m^2/g$ or less, more preferably 100 $m^2/g$ or more and 2,000 $m^2/g$ or less.

As the method of carrying the catalyst on the surface of the conductive carbon, known methods can be widely used. For example, as disclosed in Japanese Patent Application Laid-Open No. H02-111440, Japanese Patent Application Laid-Open No. 2000-003712, and the like, known is a method involving immersing conductive carbon in a solution of platinum and other metals, and then reducing the noble-metals ions, thereby carrying the catalyst on the surface of the conductive carbon. Alternatively, a target noble metal may be carried on the electrical conductive carbon by vacuum film formation such as spattering.

The electrode catalyst thus obtained is singly adhered, or is mixed with a binder, a polyelectrolyte, a water repellent, electrical conductive carbon, a solvent, and the like, to be adhered to the electrolyte membrane described above or a diffusion layer or an electrolyte membrane mentioned below.

The diffusion layers 3a and 3b can efficiently and uniformly introduce hydrogen, reformed hydrogen, methanol, and dimethyl ether as a fuel and air and oxygen as an oxidizer into the electrode catalyst layers, and is in contact with the electrodes for transfer of electrons. The diffusion layers 3a and 3b have the above-mentioned functions and are generally preferably conductive porous films, and carbon paper, carbon cross, a composite sheet of carbon and polytetrafluoroethylene, or the like can be used. A member obtained by coating the surface and inside of a diffusion layer with a fluorine coating material to perform water-repellent treatment may also be used.

As the electrodes 4a and 4b, conventionally used electrodes can be used without limitation, insofar as the electrodes can efficiently supply a fuel and an oxidizer to the diffusion layers being in contact with the electrodes 4a and 4b and can transfer electrons to or from the diffusion layer.

The gaskets 5a and 5b have functions of preventing a fuel and an oxidizer from leaking to the outside along the contact surfaces between the electrodes 4a and 4b and the electrolyte membrane 1.

Examples

Hereinafter, the present invention will be described with reference to Examples and Comparative Examples in more detail. It is to be noted that the present invention is not limited to Examples described below.

(Production Method of Electrolyte Membrane)

A compound containing a nitrogen-containing heterocyclic ring and a polymerization site, a compound containing a cyano group and a polymerization site, a compound containing an acidic group and a polymerization site, and compounds indicated in Tables 1 and 2 as other compounds were sufficiently mixed in amounts shown in Tables 1 and 2. Each mixture was a uniform liquid. Production Examples 1 to 16 are shown in Table 1 and Comparative Production Examples 1 to 3 are shown in Table 2.

TABLE 1

|  | Nitrogen-containing heterocyclic compound | Compound containing cyano group | Compound containing acidic group | Other additive |
|---|---|---|---|---|
| Production Example 1 | Acryloyl morpholine 28.2 g (1 mol) | Acrylonitrile 1.1 g (0.1 mol) | Vinylsulfonic acid 43.2 g (2 mol) | Methylenebis-acrylamide (cross linking agent) 2.0 g |
| Production Example 2 | Acryloyl morpholine 14.1 g (1 mol) | Acrylonitrile 26.5 g (5 mol) | Vinylsulfonic acid 216.0 g (20 mol) | None |
| Production Example 3 | N-vinylphthalimide 34.6 g (1 mol) | Acrylonitrile 10.6 g (1 mol) | Vinylsulfonic acid 86.4 g (4 mol) | Methylenebis-acrylamide (cross linking agent) 4.5 g |
| Production Example 4 | N-vinylphthalimide 34.6 g (1 mol) | Acrylonitrile 5.3 g (0.5 mol) | Vinylsulfonic acid 324.0 g (15 mol) | Glycerol dimethacrylate (cross linking agent) 8.0 g |
| Production Example 5 | Acryloyl morpholine 14.1 g (1 mol) | Vinylbenzyl cyanide 14.3 g (1 mol) | Vinylsulfonic acid 32.4 g (3 mol) | Glycerol dimethacrylate (cross linking agent) 4.0 g |
| Production Example 6 | Acryloyl morpholine 28.2 g (1 mol) | Acrylonitrile 1.1 g (0.1 mol) | Vinylsulfonic acid 43.2 g (3 mol) Acrylamide-methylpropane-sulfonic acid 20.7 g (0.5 mol) | Methylenebis-acrylamide (cross linking agent) 2.5 g |
| Production Example 7 | Acryloyl morpholine 14.1 g (1 mol) | Cyano ethyl acrylate 25.0 g (2 mol) | Vinylsulfonic acid 43.2 g (4 mol) | Glycerol dimethacrylate 4.5 g |
| Production Example 8 | Acryloyl morpholine 14.1 g (1 mol) | Acrylonitrile 1.1 g (0.2 mol) | Methacrylate ethyl phosphate 42.0 g (2 mol) Vinylsulfonic acid 21.6 g (1 mol) | None |
| Production Example 9 | Acryloy lmorpholine 28.2 g (1 mol) | Acrylonitrile 0.8 g (0.08 mol) | Vinylsulfonic acid 43.2 g (2 mol) | Methylenebis-acrylamide (cross linking agent) 2.0 g |
| Production Example 10 | Acryloyl morpholine 14.1 g (1 mol) | Acrylonitrile 26.5 g (5 mol) | Vinylsulfonic acid 270.0 g (25 mol) | Methylenebis-acrylamide (cross linking agent) 11.0 g |
| Production Example 11 | Acryloyl morpholine 14.1 g (1 mol) | Acrylonitrile 37.1 g (7 mol) | Vinylsulfonic acid 216.0 g (20 mol) | Methylenebis-acrylamide (cross linking agent) 11.0 g |
| Production Example 12 | Acryloyl morpholine 14.1 g (1 mol) | Acrylonitrile 1.1 g (0.1 mol) | Vinylsulfonic acid 32.4 g (4 mol) | Methylenebis-acrylamide (cross linking agent) 1.8 g |
| Production Example 13 | Acryloyl morpholine 28.2 g (1 mol) | Acrylonitrile 1.1 g (0.1 mol) | Vinylsulfonic acid 107.6 g (2 mol) | Methylenebis-acrylamide (cross linking agent) 2.0 g |
| Production Example 14 | Acryloyl morpholine 9.2 g (1 mol) | Acrylonitrile 0.3 g (0.1 mol) | Vinylsulfonic acid 28.0 g (4 mol) | Methylenebis-acrylamide (cross linking agent) 1.3 g |
| Production Example 15 | Acryloyl morpholine 9.2 g (1 mol) | Acrylonitrile 0.15 g (0.05 mol) | Vinylsulfonic acid 43.2 g (6.2 mol) | Methylenebis-acrylamide (cross linking agent) 1.3 g |

TABLE 1-continued

|  | Nitrogen-containing heterocyclic compound | Compound containing cyano group | Compound containing acidic group | Other additive |
|---|---|---|---|---|
| Production Example 16 | Acryloyl morpholine 9.2 g (1 mol) | Acrylonitrile 0.6 g (0.2 mol) | Vinylsulfonic acid 56.0 g (8 mol) | Methylenebis- acrylamide (cross linking agent) 2.6 g |

TABLE 2

|  | Nitrogen-containing heterocyclic compound | Compound containing cyano group | Compound containing acidic group | Other additive |
|---|---|---|---|---|
| Comparative Production Example 1 | None | None | Acrylamide methylpropane- sulfonic acid 50 g | Methylenebis- acrylamide (cross linking agent) 5 g Nonionic surfactant 0.005 g Concentrated ammonium sulfate (initiator) 0.005 g Water 50 g |
| Comparative Production Example 2 | Acryloyl morpholine 28.2 g (1 mol) | None | Vinylsulfonic acid 43.2 g (2.0 mol) | Acrylic acid 1.5 g (0.1 mol) Methylenebis- acrylamide (cross linking agent) 2.0 g |
| Comparative Production Example 3 | Acryloyl morpholine 9.2 g (1 mol) | None | Vinylsulfonic acid 28.0 g (4.0 mol) | Methylenebis- acrylamide (cross linking agent) 1.3 g |

The numerical values in the parentheses in Tables 1 and 2 show the relative molar ratio of the compound having a cyano group and a polymerization site and the compound having an acidic group and a polymerization site, per 1 mole of the compound having a nitrogen-containing heterocyclic ring and a polymerization site.

The structural formulae of the compounds used here are shown below.

Acryloyl-morpholine

N-vinylphthal-imide

-continued

| | |
|---|---|
| Vinylbenzyl cyanide | |
| Cyano ethyl acrylate | |
| Vinylsulfonic acid | |
| Sulfonic acid ethylphenyl methacrylate | |
| Methylene-bis acrylamide | |
| Acrylic acid | |

10 cm square of a porous film formed of polyimide (UP-ILEX PT (trade name); manufactured by Ube Industries. Ltd.; film thickness: 28 μm; opening ratio: about 40%) was immersed in each mixed liquid of Production Examples 1 to 19 and Comparative Production Example 3. Further, each resultant was put into an ultrasonic cleaner and ultrasonic waves were applied for 2 minutes.

Subsequently, the porous film was taken out from the mixed liquid, and then an electron beam with an acceleration voltage of 200 kV at a dosage of 50 kGy was irradiated thereto in a nitrogen atmosphere to perform electron beam polymerization of the mixed liquid infiltrated in the porous film. Thus, electrolyte membranes of Examples 1, 3, 5, and 7 to 19, and Comparative Example 3 of Table 3, which were infiltrated in the porous film formed of polyimide, were obtained.

In Comparative Production Example 1, a porous film formed of polyimide was immersed in a polymer precursor aqueous solution (mixed liquid shown in Comparative Production Example 1 of Table 3), thereby infiltrating the aqueous solution into the porous film. Subsequently, the porous film was pulled up from the solution, and then the porous film was left alone while being interposed between glass sheets in an oven heated to 80° C. for 2 hours to polymerize monomers in the pores, thereby obtaining an electrolyte membrane of Comparative Example 1.

Separately, a porous film formed of polyacrylonitrile was produced as follows.

With reference to Japanese Patent Application Laid-Open No. 2006-073495, a porous film formed of polyacrylonitrile was produced as follows. Specifically, 17 parts by mass of polyacrylonitrile (product of MP Biomedicals) was dissolved in 83 parts by mass of 70% nitric acid solution, thereby preparing a polyacrylonitrile resin solution. The obtained resin solution was extruded from a die while maintaining the temperature at 20° C., and immersed in 30% nitric acid solution with a temperature adjusted to 18° C., thereby forming a film-shaped molded body with a thickness of 0.1 mm. The obtained film-shaped molded body was biaxially oriented in a hot water bath with a temperature adjusted to 95° C. to be stretched by 2.5 times in the longitudinal direction and by 2.5 times in the transverse direction. The stretched porous film was immersed in methanol overnight, and then the resultant was dried at room temperature over time. The thickness of the obtained porous film was 30 μm, and the opening ratio was about 40%.

The porous film formed of polyacrylonitrile thus produced was cut into a 10 cm square. Then, in the same manner as the porous film formed of polyimide, the resultants were immersed in solutions of Production Examples 1 to 3 and put in an ultrasonic cleaner, and ultrasonic waves were applied for 2 minutes. Subsequently, the porous film was taken out from the mixed liquid, and then an electron beam with an acceleration voltage of 200 kV at a dosage of 50 kGy was irradiated thereto in a nitrogen atmosphere to perform electron beam polymerization of the mixed liquid infiltrated in the porous film. Thus, an electrolyte membrane which was infiltrated in the porous film formed of polyacrylonitrile was obtained.

In the method of producing the electrolyte membrane of Example 1, by using the mixed liquid of Comparative Production Example 2 in place of using the mixed liquid of Production Example 1 and by using a polyolefin porous film (U-Pore (trade name); manufactured by Ube Industries. Ltd.; film thickness: 25 μm) as a porous film in place of using the polyimide porous film, an electrolyte membrane of Comparative Example 2 was obtained.

The electrolyte membranes produced as described above of Examples 1 to 19 and Comparative Examples 1 to 3 are shown in Table 3. The electrolyte membranes were evaluated.

(Composition Analysis)

With respect to the electrolyte membrane of Example 3 which was produced by infiltrating the polyimide porous film with the mixed liquid of Production Example 2, the infiltrated polymer was extracted and the structure and composition thereof were identified by NMR measurement, GPC measurement, and measurement of ion exchange capacity. The chemical structure is represented by the following formula 2. There were no significant differences between the composition of the mixed liquid and the composition after the electron beam polymerization.

(2)

L = 1
m = 19.6
n = 5.1
p = 150

Incidentally, L, m, n, and p each represent a numerical value when L is defined as 1.

(Measurement of Filling Factor)

The cross sections of the obtained electrolyte membranes of Examples 1 to 19 and Comparative Examples 1 to 3 were observed with an electron microscope (magnification of 10,000 times). The area of infiltrated portions in the pores over a region of 100 μm² was estimated as a filling factor. The results are shown in Table 3.

(Measurement of Proton Conductivity)

The produced electrolyte membranes of Examples 1 to 19 and Comparative Examples 1 to 3 were cut into 2 mm in width and 3 cm in length, and platinum electrodes were brought into close contact with the front and rear surfaces of the electrolyte membrane with an interval of 1 cm being held therebetween. The electrolyte membrane with the electrode was put into a thermo-hygrostat of a temperature of 50° C. and a humidity of 90%, and then leads were taken out from the electrodes and connected to an impedance analyzer (SI-1260 (trade name); manufactured by Solartron). Impedance was measured at a frequency of from 10 MHz to 1 Hz, and the resistance was read from the diameter of a semicircle which appeared in the Cole-Cole plot and converted into electric conductivity in terms of S/cm. The results are shown in Table 3.

The electrolyte membranes of Examples 17 to 19 and Comparative Example 3 were further measured for the proton conductivity, in addition to the above-mentioned environment of a temperature of 50° C. and a humidity of 90%, under environments of a temperature of 25° C. and a humidity of 50%; a temperature of 50° C. and a humidity of 40%; a temperature of 50° C. and a humidity of 70%; and a temperature of 50° C. and a humidity of 70%. The results are shown in Table 3.

(Measurement of Output of Fuel Cell)

As a paste of a catalyst carrying conductive material for a fuel electrode, 1 g of platinum-ruthenium catalyst (TEC90110 (trade name); manufactured by Tanaka Kikinzoku Kogyo K.K.) and 5 g of 5 wt. % Nafion solution (manufactured by Aldrich) were sufficiently mixed to produce a paste. As a paste of a catalyst carrying conductive material for an air electrode, 1 g of platinum catalyst (AY-1020 (trade name); manufactured by Tanaka Kikinzoku Kogyo K.K.) and 5 g of a 5 wt. % Nafion solution (manufactured by Aldrich) were sufficiently mixed to produce a paste.

These pastes were each applied to carbon paper (TGP-H-060 (trade name); manufactured by Toray Industries, Inc.; thickness of 200 um) and dried so that the catalyst amount is 2 mg/cm², thereby obtaining a catalyst layer. Subsequently, the produced electrolyte membrane was interposed between the coating surfaces of the catalysts for the fuel electrode and for the air electrode in a sandwich form, and then the resultant was subjected to pressing with a hot press under a condition of 95° C. and 2 kN (catalyst layer area of 10 cm²).

Further, the resultant was mounted on a fuel cell unit (DFC-012 (trade name); manufactured by Chemix Co., Ltd; catalyst layer area: 10 cm²; operating temperature: 60° C.), and then hydrogen (Examples 1 to 16 and 18, Comparative Examples 1 to 3) or 10% methanol (Examples 1 to 16, Comparative Examples 1 to 3) was fed to the fuel electrode side as a fuel and air was fed to the air electrode side as an oxidizer. Then, load was applied thereto with a fuel cell test system (890B (trade name); manufactured by Scribner Associates Inc.), and then the outputs (mw/cm²) were measured. Table 3 shows the values of the outputs (mw/cm²) of the fuel cell units using the electrolyte membranes of Examples 1 to 16, 18, and Comparative Examples 1 to 3. With respect to the fuel cell unit using hydrogen as a fuel, the outputs were measured in the same manner as described above after being operated at constant current (250 mA/cm²) for 200 hours. With respect to the fuel cell units using 10% methanol as a fuel, the outputs were measured in the same manner as described above after being operated at constant current (50 mA/cm²) for 200 hours. The results are shown in Table 3.

TABLE 3

| | Production Example | Porous film | Filling factor (%) | Conductivity (S/cm) | Initial output (mw/cm²) | | Output after 200-hour operation (mw/cm²) | |
|---|---|---|---|---|---|---|---|---|
| | | | | | Hydrogen | Methanol | Hydrogen | Methanol |
| Example 1 | 1 | PI | 95 | 1.1E−1 | 275 | 56 | 275 | 55 |
| Example 2 | 1 | PAN | 98 | 1.1E−1 | 279 | 57 | 277 | 54 |
| Example 3 | 2 | PI | 97 | 1.0E−1 | 262 | 51 | 259 | 50 |
| Example 4 | 2 | PAN | 98 | 1.0E−1 | 259 | 49 | 257 | 47 |
| Example 5 | 3 | PI | 96 | 1.5E−1 | 270 | 54 | 268 | 52 |
| Example 6 | 3 | PAN | 96 | 1.6E−1 | 269 | 55 | 265 | 54 |
| Example 7 | 4 | PI | 98 | 1.4E−1 | 272 | 58 | 268 | 55 |
| Example 8 | 5 | PI | 99 | 3.2E−1 | 310 | 75 | 307 | 72 |
| Example 9 | 6 | PI | 97 | 1.2E−1 | 275 | 62 | 274 | 60 |
| Example 10 | 7 | PI | 96 | 9.6E−2 | 257 | 47 | 253 | 45 |
| Example 11 | 8 | PI | 97 | 1.0E−1 | 274 | 61 | 272 | 58 |
| Example 12 | 9 | PI | 96 | 7.7E−2 | 240 | 48 | 232 | 45 |
| Example 13 | 10 | PI | 98 | 1.1E−1 | 263 | 52 | 259 | 51 |
| Example 14 | 11 | PI | 98 | 9.2E−2 | 240 | 47 | 238 | 44 |
| Example 15 | 12 | PI | 97 | 8.7E−2 | 252 | 52 | 248 | 50 |
| Example 16 | 13 | PI | 96 | 5.4E−2 | 220 | 35 | 217 | 32 |
| Example 17 | 14 | PI | 97 | 1.5E−1 | — | — | — | — |
| Example 18 | 15 | PI | 97 | 1.5E−1 | Addition | — | Addition | — |

TABLE 3-continued

| | Production Example | Porous film | Filling factor (%) | Conductivity (S/cm) | Initial output (mw/cm$^2$) Hydrogen | Initial output (mw/cm$^2$) Methanol | Output after 200-hour operation (mw/cm$^2$) Hydrogen | Output after 200-hour operation (mw/cm$^2$) Methanol |
|---|---|---|---|---|---|---|---|---|
| Example 19 | 16 | PI | 98 | 2.1E−1 | — | — | — | — |
| Comparative Example 1 | Compare 1 | PI | 53 | 7.5E−3 | 175 | 40 | 120 | 20 |
| Comparative Example 2 | Compare 2 | PO | 97 | 9.8E−2 | 246 | 51 | 205 | 43 |
| Comparative Example 3 | Compare 3 | PI | 97 | 9.0E−2 | Addition | — | Addition | — |

(Note)
The reference characters of porous films in Table 3 mean the following.
PI: Polyimide porous film
PAN: Polyacrylonitrile porous film
PO: Polyolefine porous film The filling factor of all examples other than Comparative Example 1 in which solution reaction was used were 95% or higher.

Examples 1 to 16 and 18 showed excellent proton conductivity, initial output, and output after 200-hour operation as compared with Comparative Examples.

When the proton conductivity is approximately $10^{-1}$ S/cm or more under the operating temperature and the operating humidity, sufficient outputs can be extracted when the electrolyte membrane with such electrical conductivity was made into a fuel cell.

In the electrolyte membrane of Comparative Example 1, the proton conductive component contained neither a nitrogen-containing heterocyclic compound nor a compound containing a cyano group, presumably resulting in that the adhesion between the proton conductive component and the porous film was poor and the output after 200-hour operation decreased.

In Comparative Example 2, the porous film did not contain a nitrogen-containing heterocyclic ring nor a cyano group and a polymer compound constituting the proton conductive component contained a nitrogen-containing heterocyclic ring and an acidic group in one molecule. However, no cyano group was contained, and the proton conductive component and the porous film were not firmly adhered to each other, presumably resulting in that the output was lowered 200 hours after.

In Comparative Example 3, the porous film contained a nitrogen-containing heterocyclic ring and a polymer compound constituting the proton conductive component contained a nitrogen-containing heterocyclic ring and an acidic group in one molecule. However, no cyano group was contained, and the proton conductive component and the porous film were not firmly adhered to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-288061, filed Oct. 23, 2006, which is hereby incorporated by reference herein in its entirety.

The invention claimed is:

1. An electrolyte membrane, comprising:
a porous film containing a nitrogen-containing heterocyclic ring or a cyano group; and
a proton conductive component existing in pores of the porous film,
wherein the proton conductive component comprises a polymer compound containing at least a nitrogen-containing heterocyclic ring, a cyano group, and an acidic group in one molecule.

2. The electrolyte membrane according to claim 1, wherein the polymer compound comprises at least a nitrogen-containing heterocyclic ring, a cyano group, and an acidic group at a side chain.

3. The electrolyte membrane according to claim 1, wherein the nitrogen-containing heterocyclic ring of the polymer compound is at least one of a morpholine ring and a phthalimide ring.

4. The electrolyte membrane according to claim 2, wherein the nitrogen-containing heterocyclic ring of the polymer compound is at least one of a morpholine ring and a phthalimide ring.

5. The electrolyte membrane according to claim 1, wherein the polymer compound has a structure represented by General Formula (1):

wherein L is 1; m is 2 or more and 25 or less; n is 0.05 or more and 7 or less; a polymerization degree p is 1 or more and 30,000 or less; $R_1$, $R_2$, and $R_3$ are each independently selected from a hydrogen atom and a methyl group; $R_4$ is selected from an alkylene group containing an acyl group or an ester bond, a phenylene group containing an acyl group or an ester bond, a phenylene alkyl group containing an acyl group or an ester bond, a single bond, and an acyl group having 1 to 8 carbon atoms; $R_5$ and $R_6$ are each independently a single bond, an alkylene group having 1 to 8 carbon atoms, a phenylene group, or an alkyl phenylene group; and $R_5$ and $R_6$ may contain at least one of an acyl group, an ester bond, and a hetero atom.

6. The electrolyte membrane according to claim 1, wherein the porous film comprises one of polyimide and polyacrylonitrile.

7. A fuel cell comprising the electrolyte membrane set forth in claim 1.

8. A method of producing an electrolyte membrane, which comprises:

infiltrating a porous film containing a nitrogen-containing heterocyclic ring or a cyano group with a mixed liquid comprising a compound having a nitrogen-containing heterocyclic ring, a compound having a cyano group, and a compound having an acidic group; and polymerizing the compounds in the mixed liquid infiltrated in the porous film.

9. The method according to claim 8, wherein the polymerization of the compounds in the mixed liquid infiltrated in the porous film is performed by irradiating the porous film infiltrated with the mixed liquid, with an electron beam.

* * * * *